United States Patent
Oyama

(10) Patent No.: US 10,899,851 B2
(45) Date of Patent: Jan. 26, 2021

(54) METHOD FOR PRODUCING HYDROGENATED CONJUGATED DIENE POLYMER LATEX

(71) Applicant: ZEON CORPORATION, Tokyo (JP)

(72) Inventor: Fuminari Oyama, Tokyo (JP)

(73) Assignee: ZEON CORPORATION, Tokyo (JP)

(*) Notice: Subject to any disclaimer, the term of this patent is extended or adjusted under 35 U.S.C. 154(b) by 0 days.

(21) Appl. No.: 16/218,792

(22) Filed: Dec. 13, 2018

(65) Prior Publication Data
US 2019/0202943 A1   Jul. 4, 2019

(51) Int. Cl.
| | |
|---|---|
| *C08C 19/02* | (2006.01) |
| *B01J 27/13* | (2006.01) |
| *C08L 15/00* | (2006.01) |
| *C08F 8/04* | (2006.01) |
| *B01J 23/44* | (2006.01) |
| *B01J 31/00* | (2006.01) |

(52) U.S. Cl.
CPC ............ *C08C 19/02* (2013.01); *B01J 23/44* (2013.01); *B01J 27/13* (2013.01); *B01J 31/00* (2013.01); *C08F 8/04* (2013.01); *C08L 15/005* (2013.01)

(58) Field of Classification Search
CPC ......... C08C 19/02; B01J 27/13; C08L 15/005
See application file for complete search history.

(56) References Cited

U.S. PATENT DOCUMENTS

| 5,272,202 A | 12/1993 | Kubo et al. | |
|---|---|---|---|
| 2004/0241066 A1* | 12/2004 | Jasra | C22B 7/007 423/22 |
| 2012/0130005 A1 | 5/2012 | Senda et al. | |
| 2013/0281604 A1 | 10/2013 | Senda et al. | |
| 2017/0101558 A1 | 4/2017 | Nakashima et al. | |
| 2019/0093723 A1 | 3/2019 | Inoue | |
| 2019/0093724 A1 | 3/2019 | Oyama et al. | |
| 2020/0048375 A1* | 2/2020 | Ono | C08C 19/02 |

FOREIGN PATENT DOCUMENTS

| EP | 2457933 A1 | 5/2012 | |
|---|---|---|---|
| EP | 3124512 A1 | 2/2017 | |
| JP | H02-178305 A | 7/1990 | |
| JP | 2004-043600 A | 2/2004 | |
| JP | 2004141694 A * | 5/2004 | |
| WO | WO-03085008 A1 * | 10/2003 | ............. C08C 19/02 |
| WO | 2017/164077 A1 | 9/2017 | |
| WO | 2017/164078 A1 | 9/2017 | |

OTHER PUBLICATIONS

Mar. 16, 2020 Extended European Search Report issued in European Patent Application No. 18212491.7.

* cited by examiner

*Primary Examiner* — Mark S Kaucher
(74) *Attorney, Agent, or Firm* — Oliff PLC

(57) ABSTRACT

A method for producing a hydrogenated conjugated diene polymer latex includes: a hydrogenation step of dissolving or dispersing a hydrogenation catalyst containing a platinum group element in a latex of a conjugated diene polymer to hydrogenate a carbon-carbon unsaturated bond in the conjugated diene polymer; and an insoluble complex formation step of complexing the platinum group element in the latex with a complexing agent to form an insoluble complex, wherein pH of the latex at the insoluble complex formation step is controlled in a range of 5.0 to 8.0.

6 Claims, 1 Drawing Sheet

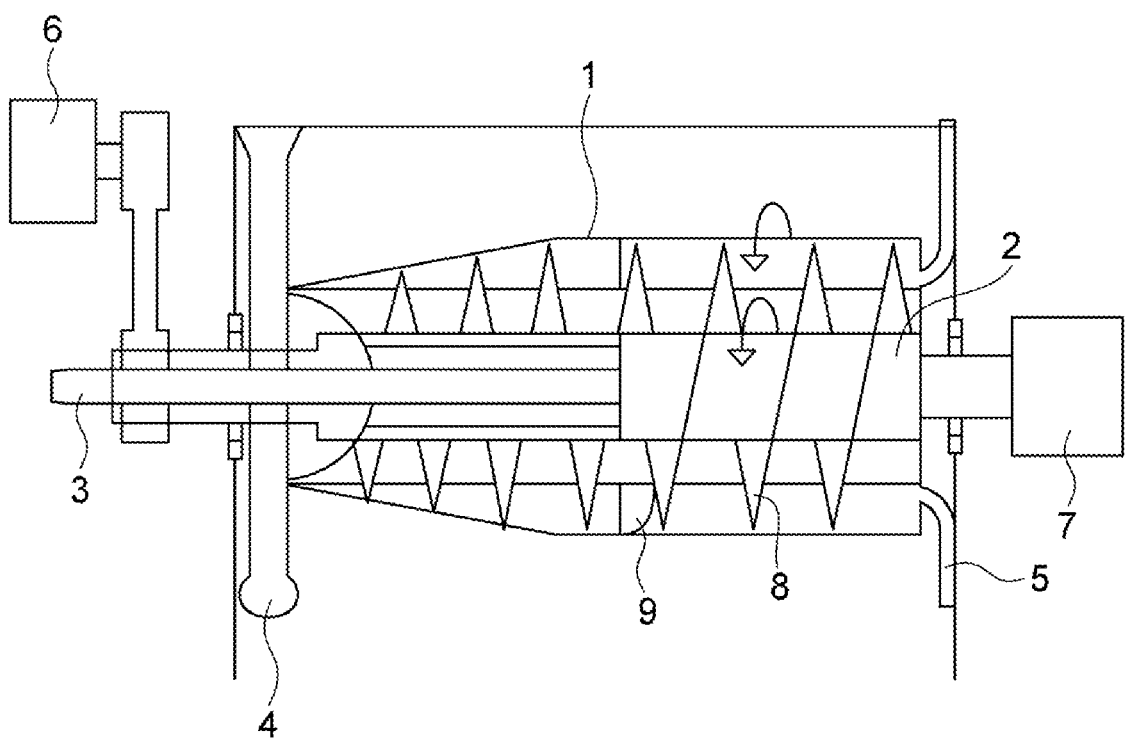

METHOD FOR PRODUCING HYDROGENATED CONJUGATED DIENE POLYMER LATEX

TECHNICAL FIELD

The present invention relates to a method for producing a hydrogenated conjugated diene polymer latex, and more particularly relates to a method for producing a hydrogenated conjugated diene polymer latex where a hydrogenation catalyst can be removed and recovered in an energy-saving way and in a short time at a high removal and recovery efficiency.

BACKGROUND ART

In the chemical industry for producing medicines and agrochemicals, petrochemical products, polymers and the like, a hydrogenation reaction is widely performed for hydrogenating carbon-carbon unsaturated bonds or carbon-nitrogen unsaturated bonds included in various compounds, and converting the bonds to corresponding saturated bonds.

For example, in the field of polymer production, as a useful reforming means for a conjugated diene polymer, a method for hydrogenating selectively or partially a carbon-carbon double bond of a conjugated diene polymer is known, and a hydrogenated conjugated diene polymer such as a hydrogenated acrylonitrile-butadiene copolymer is produced on an industrial scale.

As a typical processes for producing such a hydrogenated conjugated diene polymer, a process including (1) a step of performing an emulsion polymerization of a monomer containing a conjugated diene and coagulating and drying the obtained latex to prepare a source polymer; (2) a step of dissolving the source polymer in an organic solvent and hydrogenating the same using a supported (heterogeneous) catalyst where a hydrogenation catalyst is supported on a carrier insoluble in the organic solvent; and (3) a step of separating the supported catalyst from the hydrogenation reaction mixture, and recovering the target hydrogenated polymer out of the organic solvent; has been known.

However, the above process requires further an operation of dissolving again the source polymer which is once recovered from the latex of the conjugated diene polymer into an organic solvent, and distilling away the organic solvent which is used for the hydrogenation reaction after the reaction. Therefore, from the viewpoint of improving the productivity, development of a process of hydrogenating a conjugated diene polymer in a latex state is strongly demanded, and various studies have been made (see, for example, Patent Document 1).

In the method of hydrogenating a conjugated diene polymer in a latex state, there has been a drawback in that, although the contact efficiency between a polymer in a latex and a hydrogenation catalyst is improved by using an unsupported catalyst which can be dissolved or dispersed in an aqueous medium so that the hydrogenation activity is enhanced, separation of the catalyst after completion of the reaction is extremely difficult, and recovery and reuse of the catalyst are not possible, which increases therefore the catalyst cost remarkably.

Meanwhile, Patent Document 2 proposes a method of causing a complexing agent to act on a hydrogenation catalyst containing a platinum group element to form an insoluble complex and removing the hydrogenation catalyst in a state of the insoluble complex. According to the technique of Patent Document 2, it becomes possible to remove and recover the hydrogenation catalyst to some extent by making the hydrogenation catalyst in the complex state, however the removal and recovery efficiency is not necessarily sufficient, and improvement of the removal and recovery efficiency has been desired.

RELATED ART

Patent Documents

Patent Document 1: Japanese Patent Laid-Open No. H2-178305
Patent Document 2: Japanese Patent Laid-Open No. 2004-43600

SUMMARY OF THE INVENTION

Problem to be Solved by the Invention

The present invention has been made in view of the above circumstances with an object to provide a method for producing a hydrogenated conjugated diene polymer latex where a hydrogenation catalyst can be removed and recovered in an energy-saving way and in a short time at a high removal and recovery efficiency.

Means for Solving the Problem

The present inventor studied diligently for achieving the above object to find that a hydrogenation catalyst can be removed and recovered in an energy-saving way and in a short time at a high removal and recovery efficiency by dissolving or dispersing a hydrogenation catalyst containing a platinum group element in a latex of a conjugated diene polymer to hydrogenate a carbon-carbon unsaturated bond in the polymer; and then the pH of the latex is adjusted in the range of 5.0 to 8.0 when complexing the platinum group element in the latex with a complexing agent to form an insoluble complex, thereby completing the present invention.

That is, the present invention provides a method for producing a hydrogenated conjugated diene polymer latex comprising:
a hydrogenation step of dissolving or dispersing a hydrogenation catalyst containing a platinum group element in a latex of a conjugated diene polymer to hydrogenate a carbon-carbon unsaturated bond in the conjugated diene polymer by; and
an insoluble complex formation step of complexing the platinum group element in the latex with a complexing agent to form an insoluble complex;
wherein pH of the latex at the insoluble complex formation step is adjusted in a range of 5.0 to 8.0.

In the production method of the present invention, the amount of the complexing agent used is preferably an amount equivalent to 1.0 to 3.0 times a stoichiometric composition ratio capable of forming a complex with the platinum group element.

In the production method of the present invention, the insoluble complex is preferably formed by adding a solution or a dispersion containing the complexing agent to the latex.

In the production method of the present invention, the contact time between the platinum group element and the complexing agent is preferably 2 to 5 hours.

The production method of the present invention preferably further comprises an insoluble complex removal step of removing the insoluble complex from the latex having undergone the insoluble complex formation step.

Effects of Invention

The present invention can provide a method for producing a hydrogenated conjugated diene polymer latex wherein a hydrogenation catalyst can be removed and recovered in an energy-saving way and in a short time at a high removal and recovery efficiency.

BRIEF DESCRIPTION OF DRAWING

FIG. 1 is a view showing an example of a centrifugal separation apparatus used in the method of the present invention for producing a hydrogenated conjugated diene polymer latex.

DESCRIPTION OF EMBODIMENTS

A method for producing a hydrogenated conjugated diene polymer latex according to the present invention comprises:

a hydrogenation step of dissolving or dispersing a hydrogenation catalyst containing a platinum group element in a latex of a conjugated diene polymer to hydrogenate a carbon-carbon unsaturated bond in the conjugated diene polymer; and an insoluble complex formation step of complexing the platinum group element in the latex with a complexing agent to form an insoluble complex;

wherein pH of the latex at the insoluble complex formation step is adjusted in a range of 5.0 to 8.0.

Latex of Conjugated Diene Polymer

The latex of a conjugated diene polymer used in the production method of the present invention is generally obtained by emulsion polymerization of a conjugated diene monomer, and a monomer copolymerizable with a conjugated diene monomer to be used as required. As a latex of a conjugated diene polymer, one to be yielded by a phase inversion method subsequent to solution polymerization may be used.

A conjugated diene monomer is not particularly limited, insofar as it is a polymerizable monomer having a conjugated diene structure, and examples thereof include 1,3-butadiene, 2-methyl-1,3-butadiene (isoprene), 2,3-dimethyl-1,3-butadiene, 2-chloro-1,3-butadiene, 1,3-pentadiene, and the like. Among these, 1,3-butadiene and 2-methyl-1,3-butadiene are preferable, and 1,3-butadiene is more preferable.

Examples of a monomer copolymerizable with a conjugated diene monomer include an α,β-ethylenically unsaturated nitrile monomer, such as acrylonitrile, methacrylonitrile, and crotononitrile; an α,β-ethylenically unsaturated carboxylic acid, such as acrylic acid, methacrylic acid, crotonic acid, fumaric acid, maleic acid, and itaconic acid, and anhydrides thereof; an α,β-ethylenically unsaturated carboxylic acid ester, such as methyl acrylate, n-butyl acrylate, 2-ethylhexyl acrylate, trifluoroethyl acrylate, methyl methacrylate, and methyl crotonate; an α,β-ethylenically unsaturated dicarboxylic acid monoester monomer, such as mono-n-butyl maleate, mono-n-butyl itaconate, mono-n-butyl fumarate, and mono-cyclohexyl fumarate; an alkoxyalkyl (meth)acrylic acid ester monomer, such as methoxymethyl (meth)acrylate, methoxyethyl (meth)acrylate, ethoxymethyl (meth)acrylate, and ethoxyethyl (meth)acrylate; an α,β-ethylenically unsaturated polyvalent carboxylic acid monomer; an α,β-ethylenically unsaturated carboxylic acid amide, such as acrylamide, and methacrylamide; a vinyl aromatic compound, such as styrene, α-methylstyrene, p-methylstyrene, and divinylbenzene; a vinyl ester, such as vinyl acetate, and vinyl propionate; and a vinyl ether compound, such as fluoroethyl vinyl ether.

Specific examples of a conjugated diene polymer composing a latex of a conjugated diene polymer used in the production method of the present invention include a butadiene polymer, an isoprene polymer, a butadiene/styrene copolymer, an acrylonitrile/butadiene copolymer, an acrylonitrile/isoprene copolymer, an acrylonitrile/butadiene/isoprene copolymer, a methacrylonitrile/butadiene copolymer, a methacrylonitrile/isoprene copolymer, a methacrylonitrile/butadiene/isoprene copolymer, an acrylonitrile/methacrylonitrile/butadiene copolymer, an acrylonitrile/butadiene/methyl acrylate copolymer, an acrylonitrile/butadiene/acrylic acid copolymer, an acrylonitrile/butadiene/methacrylic acid copolymer, an acrylonitrile/butadiene/n-butyl acrylate copolymer, and an acrylonitrile/butadiene/n-butyl acrylate/mono-n-butyl itaconate copolymer.

The composition ratio of the monomer units constituting a conjugated diene polymer is not particularly limited but 5 to 100% by weight of the conjugated diene monomer unit and 95 to 0% by weight of a monomer copolymerizable with the conjugated diene is preferable, 10 to 90% by weight of the conjugated diene monomer unit and 90 to 10% by weight of a monomer copolymerizable with the conjugated diene is more preferable. Further, the weight average molecular weight (gel permeation chromatography method, in terms of standard polystyrene) of a conjugated diene polymer is not particularly limited but ordinarily 5,000 to 2,000,000.

An emulsion polymerization method as a preferred method for preparing a conjugated diene polymer is to carry out polymerization generally in an aqueous medium using a radical polymerization initiator. In the emulsion polymerization method, as a polymerization initiator, or a molecular weight modifier, a publicly known one may be used. The polymerization reaction may be any of batch, semi-batch or continuous method, and the polymerization temperature or pressure are not particularly limited. The emulsifier to be used is also not particularly limited, and an anionic surfactant, a cationic surfactant, an amphoteric surfactant, a nonionic surfactant and the like may be used, but an anionic surfactant is preferable. These emulsifiers may be used singly, or in combination of two or more kinds thereof. The amount used is not particularly limited.

The solid concentration of a latex of the conjugated diene polymer obtained by emulsion polymerization is not particularly limited but ordinarily 2 to 50% by weight, preferably 5 to 45% by weight. The solid content concentration may be appropriately adjusted by a known method, such as a blending method, a dilution method, and a concentration method.

Hydrogenation Step

The hydrogenation step in a production method of the present invention is a step of dissolving or dispersing a hydrogenation catalyst containing a platinum group element in the latex of a conjugated diene polymer to hydrogenate a carbon-carbon unsaturated bond in the polymer.

As the hydrogenation catalyst containing a platinum group element used in the hydrogenation step, any water-soluble or water-dispersible platinum group element compound may be used, and specific examples thereof include a ruthenium compound, a rhodium compound, a palladium compound, an osmium compound, an iridium compound, a platinum compound and the like. In the production method of the present invention, such a hydrogenation catalyst is used for a hydrogenation reaction in a dissolved or dispersed state in the latex of a conjugated diene polymer without being supported on a carrier. As a hydrogenation catalyst, a palladium compound, or a rhodium compound is preferable, and a palladium compound is particularly preferable. Further, two or more platinum group elements may be used in combination, however also in such a case it is preferable to use a palladium compound as a main catalyst component.

A palladium compound is not particularly limited, insofar as it is water-soluble or water-dispersible, and exhibits catalytic activity for hydrogenation, and a water-soluble one is preferable. As a palladium compound, a divalent or tetravalent palladium compound is ordinarily used, and examples of the form thereof include a salt, and a complex salt.

Examples of a palladium compound include an organic acid salt, such as palladium acetate, palladium formate, and palladium propionate; an inorganic acid salt, such as palladium nitrate, and palladium sulfate; a halide, such as palladium fluoride, palladium chloride, palladium bromide, and palladium iodide; an inorganic palladium compound, such as palladium oxide, and palladium hydroxide; an organic palladium compound, such as dichloro(cyclooctadiene)palladium, dichloro(norbornadiene)palladium, and dichlorobis(triphenylphosphine)palladium; a halide salt, such as sodium tetrachloropalladate, and ammonium hexachloropalladate; a complex salt, such as potassium tetracyanopalladate; and the like. Among these palladium compounds, an organic acid salt, or an inorganic acid salt, such as palladium acetate, palladium nitrate, and palladium sulfate; palladium chloride; a halide salt, such as sodium tetrachloropalladate, and ammonium hexachloropalladate; are preferable, and palladium acetate, palladium nitrate, and palladium chloride are more preferable.

Examples of a rhodium compound include a halide, such as rhodium chloride, rhodium bromide, and rhodium iodide; an inorganic acid salt, such as rhodium nitrate, and rhodium sulfate; an organic acid salt, such as rhodium acetate, rhodium formate, rhodium propionate, rhodium butyrate, rhodium valerate, rhodium naphthenate, and rhodium acetylacetonate; rhodium oxide; rhodium trihydroxide; and the like.

As the platinum group element compound, a commercially available one may be used, or one prepared by a publicly known method may be used. A method for dissolving or dispersing a platinum group element compound in the latex of a conjugated diene polymer is not particularly limited, and examples thereof include a method of directly adding a platinum group element compound to the latex, a method of adding a platinum group element compound in the state of being dissolved or dispersed in water into the latex, and the like. When dissolving or dispersing the same in water, it may be preferable in some cases, if coexisting an inorganic acid, such as nitric acid, sulfuric acid, hydrochloric acid, bromic acid, perchloric acid, and phosphoric acid; a sodium salt, a potassium salt of the inorganic acid; an organic acid such as acetic acid; and the like, because the solubility of the platinum group element compound in water is increased.

In the production method of the present invention, by using the platinum group element compound dissolved or dispersed in the latex of a conjugated diene polymer, a hydrogenation reaction can be efficiently advanced in the latex state. In this regard, in the hydrogenation reaction, the pH of a hydrogenation reaction solution (conjugated diene polymer latex) measured by a pH meter is not particularly limited, insofar as the pH is 12 or less, and preferably in the range of 2.0 to 11.0, more preferably 3.0 to 10.5, and further preferably 4.0 to 10.0.

The pH of a hydrogenation reaction solution (latex of conjugated diene polymer) can be adjusted by using a basic compound, an acidic compound, and the like. The basic compound is not particularly limited, and examples thereof include an alkali metal compound, an alkaline earth metal compound, ammonia, an ammonium salt compound, an organic amine compound, and the like. Among these, an alkali metal compound, and an alkaline earth metal compound are preferable. The acidic compound is not particularly limited, and examples thereof include sulfuric acid, nitric acid, and the like.

As the alkali metal compound, a hydroxide, such as lithium hydroxide, sodium hydroxide, and potassium hydroxide; a carbonate compound, such as lithium carbonate, sodium carbonate, and potassium carbonate; and a hydrogencarbonate compound, such as lithium hydrogencarbonate, sodium hydrogencarbonate, and potassium hydrogencarbonate; may be favorably used, and among these a hydroxide is more preferable.

As the alkaline earth metal compound, a hydroxide, a carbonate compound, or a hydrogencarbonate compound of an alkaline earth metal, such as magnesium, calcium, strontium, and barium, may be favorably used, and among these a hydroxide is more preferable.

Examples of the ammonium salt compound include ammonium carbonate, ammonium hydrogencarbonate, and the like.

Examples of the organic amine compound include triethylamine, ethanolamine, morpholine, N-methylmorpholine, pyridine, hexamethylenediamine, dodecamethylenediamine, xylylenediamine, and the like.

These basic compounds and acidic compounds may be used as they are, or may be used after dilution or dissolution with water or an organic solvent such as an alcohol. The basic compounds or the acidic compounds may be used singly or in combination of two or more kinds thereof, and the amount thereof used may be appropriately selected such that the hydrogenation reaction solution exhibits a predetermined pH. There is also no particular restriction on the method and timing of addition of a basic compound, or an acidic compound to a hydrogenation reaction solution, and there are, for example, a method where a basic compound or an acidic compound is added in advance into the latex before a hydrogenation catalyst is added to a hydrogenation reaction solution, and a method where a basic compound or an acidic compound is added after the initiation of a hydrogenation reaction.

Further, a catalyst stabilizer may be used for the purpose of maintaining the stability of a platinum group element compound in the latex. Specific examples of the catalyst stabilizer include polyvinylpyrrolidone, polyvinyl alcohol, polyvinyl acetal, sodium polyacrylate, sodium polyphosphate, gelatin, albumin, protalbic acid, and lysalbic acid. Among these, polyvinylpyrrolidone, polyvinyl alcohol, and sodium polyacrylate are preferable.

The temperature of a hydrogenation reaction is ordinarily 0° C. to 200° C., preferably 5° C. to 150° C., and more preferably 10 to 100° C. The pressure of hydrogen is ordinarily 0.1 MPa to 20 MPa, preferably 0.1 MPa to 15 MPa, and more preferably 0.1 MPa to 10 MPa. The reaction time is not particularly restricted, but it is ordinarily 30 min to 50 hours.

In the hydrogenation step of the production method of the present invention, a hydrogenation reaction can be rapidly progressed in spite of the reaction in the latex state. The hydrogenation ratio of the hydrogenated conjugated diene polymer to be obtained (the ratio of hydrogenated carbon-carbon double bonds to the total carbon-carbon double bonds present in the polymer before the reaction) may be regulated at will in the range of 1 to 100% by controlling appropriately the above-described various reaction conditions. The hydrogenation ratio represented by iodine values is preferably 120 or less.

Insoluble Complex Formation Step

The insoluble complex formation step of the production method of the present invention is a step of forming an insoluble complex by causing a platinum group element in a platinum group element compound present in an aqueous medium or in polymer particles in the latex of a conjugated diene polymer after completion of the hydrogenation reaction to form a complex with a complexing agent. The insoluble complex is formed as a precipitate in the latex.

In the production method of the present invention, by adjusting the pH of the latex at the time of complex formation in the range of 5.0 to 8.0, the insoluble complex formation step can be completed in an energy-saving way and in a short time, and further the hydrogenation catalyst can be removed and recovered at a high removal and recovery efficiency. The pH of the latex at the time of complex formation is preferably in the range of 6.0 to 8.0, and more preferably in the range of 6.5 to 7.5. The pH of the latex at the time of complex formation may be adjusted by using the above-mentioned basic compound, acidic compound, and the like. The pH of the latex at the time of complex formation is the pH after addition of all additives, such as a complexing agent, and an oxidizing agent described below. For example, when the pH of the latex falls outside the above range by reason of addition of a solution or dispersion containing a complexing agent as described below, the pH can be adjusted within the above range by using the aforementioned basic compound, acidic compound, and the like. Further, when a hydrogenation reaction is carried out on the latex of a conjugated diene polymer at the hydrogenation step in a state where the pH is regulated in the range of 5 to 8, the pH of the latex at the time of complex formation can be regulated into the above range. The pH regulated at the hydrogenation step ordinarily does not change significantly until the insoluble complex formation step, unless a compound that changes the pH is added after the pH regulation.

A complexing agent is not particularly limited, insofar as it exhibits a complexing action on a platinum group element, and forms a complex which is insoluble in water together with a platinum group element, one capable of forming a strongly cohesive insoluble complex is preferable. Examples of a complexing agent include an oxime compound, a dioxime compound is preferable from the viewpoint of high complex forming ability, and an α,β-alkanedione dioxime, such as dimethylglyoxime, and cyclohexanedione dioxime, is more preferable. Among these, dimethylglyoxime is particularly preferable.

The amount of a complexing agent used is preferably 1.0 to 3.0 times a stoichiometric composition ratio capable of forming a complex with a platinum group element contained in a platinum group element compound, more preferably 1.0 to 1.8 times, and further preferably 1.0 to 1.5 times. When the amount of a complexing agent used is regulated within the above range, a hydrogenation catalyst can be removed and recovered in a more energy-saving way and in a shorter time at a higher removal and recovery efficiency.

The method for adding a complexing agent is not particularly limited and a complexing agent may be added to a latex of a conjugated diene polymer after the completion of the hydrogenation reaction in a state of powder, solution, or dispersion. However, it is preferable to add a solution or dispersion containing a complexing agent to the latex, because a hydrogenation catalyst can be removed and recovered in a more energy-saving way and in a shorter time at a higher removal and recovery efficiency. When a complexing agent is added to the latex in a state of powder, the complexing agent may not be sufficiently dissolved or dispersed in the latex, and the removal and recovery efficiency tends to become inferior, and there is a risk that this tendency may become especially noticeable in the production method of the present invention in which the pH of the latex is in the above-mentioned range.

When a solution or dispersion containing a complexing agent is used, the pH of the solution or dispersion is preferably in the range of 12.6 to 13.3, and more preferably in the range of 12.7 to 13.0. The pH of a solution or dispersion containing a complexing agent may be regulated by using the above-mentioned basic compound, acidic compound, and the like. By regulating the pH of the solution or dispersion in the above range, a complexing agent can be sufficiently dissolved or dispersed in the solution or dispersion, and a hydrogenation catalyst can be removed and recovered in a more energy-saving way and in a shorter time at a higher removal and recovery efficiency.

A complexing agent is added according to the above method, and then the complexing agent and a platinum group element compound are brought into contact with each other by stirring, mixing, etc. to form a complex. Then the thus formed insoluble complex is preferably made to grow or aggregate to have a particle size larger than the polymer particles contained in the latex from the viewpoint of properly removing and recovering the complex at the time of removal and recovery of the same from the latex in an insoluble complex removal step described below. Specifically, it is preferable that the latex which is added a complexing agent is stirred as above in a heated state, subsequently left to stand still keeping the heated state, and then cooled down.

When the complexing agent and the platinum group element compound are made to contact with each other, the contact temperature is preferably 50 to 90° C., more preferably 55 to 85° C., and further preferably 70 to 80° C. By setting the contact time within the above range, a hydrogenation catalyst can be removed and recovered in a more energy-saving way and in a shorter time at a higher removal and recovery efficiency without sacrificing the stability of the complex.

When the complexing agent and the platinum group element compound are made to contact with each other, the contact time is preferably 2 to 5 hours, more preferably 2 to 4 hours, and further preferably 2 to 3 hours. According to the production method of the present invention, even after such a short contact time, a hydrogenation catalyst can be removed and recovered at a higher removal and recovery efficiency.

In the production method of the present invention, it is preferable to perform an oxidation treatment for oxidizing a catalyst in the reduced state present in a latex with respect to a latex having undergone a hydrogenation reaction, before a complexing agent is added, or when a complexing agent is added and mixed. The oxidation treatment may be ordinarily carried out by using an oxidizing agent and bringing the oxidizing agent into contact with the catalyst in the reduced state present in the latex. By carrying out the oxidation treatment, an insoluble complex can be more easily formed in the insoluble complex formation step.

The oxidizing agent is not particularly limited, insofar as it is capable of oxidizing a catalyst, and examples thereof include air (oxygen); a peroxide, such as a hydrogen peroxide, peracetic acid, perbenzoic acid; and the like, and air, and hydrogen peroxide are preferable, and hydrogen peroxide is particularly preferable.

The amount of an oxidizing agent used is not particularly limited, and preferably 10 to 50 molar equivalents with respect to a platinum group element contained in a platinum group element compound used as the hydrogenation catalyst, more preferably 20 to 50 molar equivalents, and further preferably 30 to 40 molar equivalents. By setting the amount of an oxidizing agent used in the above range, a hydrogenation catalyst can be removed and recovered in a more energy-saving way and in a shorter time at a higher removal and recovery efficiency.

When the catalyst in the reduced state and the oxidizing agent are made to contact with each other, the contact temperature is preferably 50 to 90° C., more preferably 55 to 85° C., and further preferably 70 to 80° C. The contact time is preferably 2 to 5 hours, more preferably 2 to 4 hours, and further preferably 2 to 3 hours.

The method of bringing a catalyst and an oxidizing agent into contact with each other is not same depending on the type of the oxidizing agent, and in a case where air is used as the oxidizing agent, examples of the method include a method where air is continuously blown into a latex in the open state; a method where the gas phase in a container in the open state or tightly closed state is filled with an air atmosphere and a latex is stirred. In a case where hydrogen peroxide is used, hydrogen peroxide may be added into a latex which is then stirred.

According to the production method of the present invention, the complexing treatment and the oxidizing treatment may be carried out at the same time, and it is not always required to sequentially perform the complexing treatment after the oxidation treatment. When the complexing treatment and the oxidizing treatment are carried out at the same time, a hydrogenation catalyst can be removed and recovered in a more energy-saving way and in a shorter time while maintaining a high removal and recovery efficiency.

In a case where the complexing treatment and the oxidizing treatment are carried out at the same time, the contact temperature at which the complexing agent and oxidizing agent are brought into contact with a platinum group element compound, is preferably 50 to 90° C., more preferably 55 to 85° C., and further preferably 70° C. to 80° C. Further, the contact time is preferably 2 to 5 hours, more preferably 2 to 4 hours, and further preferably 2 to 3 hours.

Insoluble Complex Removal Step

In a latex that has undergone the insoluble complex formation step, an insoluble complex is precipitated. In the production method of the present invention, it is preferable to remove the insoluble complex from the latex that has undergone the insoluble complex formation step. As a method for removing the insoluble complex from the latex, there is a method where the latex is filtrated. It is also preferable to increase the solid content concentration of the latex by centrifugation and then filtration is performed, because the filtration time can be shortened.

Although the centrifugation and filtration may be carried out batchwise, or continuously, a continuous process is preferable, because a hydrogenation catalyst can be removed and recovered with excellent operability, energy efficiency, and in a short time at a high removal and recovery efficiency.

In other words, the insoluble complex removal step in the production method of the present invention is preferably a step of removing continuously an insoluble complex from a latex by feeding continuously the latex containing the insoluble complex obtained in the insoluble complex formation step to a centrifuge machine to perform continuously a centrifugation operation. Further, the insoluble complex removal step is preferably a step at which an insoluble complex may be continuously removed, and the insoluble complex may be continuously discharged out of the centrifuge machine. When an insoluble complex is removed from a latex containing the insoluble complex, it is preferable that a centrifuge machine is used, the latex is continuously fed to the centrifuge machine, a centrifugation operation is carried out continuously, and the insoluble complex removed from the latex is continuously discharged out of the centrifuge machine. By doing so, the frequency of repair services caused by clogging, etc. of the centrifuge machine may be remarkably reduced, and therefore the removal of the insoluble complex can be continued for an extended time period. In addition, the water content in the insoluble complex removed and recovered can also be reduced.

The feed rate of the latex to the centrifuge machine in the insoluble complex removal step is preferably 0.5 to 15 $m^3$/hour, more preferably 0.8 to 13.0 $m^3$/hour, and further preferably 1.0 to 11.0 $m^3$/hour. By setting the feed rate of the latex to the centrifuge machine within the above range, the centrifugation treatment may be performed sufficiently while maintaining the productivity, and the recovery rate of a platinum group element contained in the hydrogenation catalyst may be enhanced, and the water content in the insoluble complex removed and recovered can also be reduced.

The centrifugal force in the centrifugation operation is preferably 200 to 10,000 G, more preferably 250 to 9,000 G, and further preferably 300 to 8,000 G. By setting the centrifugal force in the centrifugation operation within the above range, the centrifugation treatment can be sufficiently performed, the recovery rate of a platinum group element contained in the hydrogenation catalyst can be enhanced, the water content in the insoluble complex removed and recovered can also be reduced, clogging due to aggregation of the insoluble complex, etc. becomes less liable to occur in the centrifuge machine, and a continuous operation over an extended time period becomes possible so that the operability and productivity can be excellent.

In the insoluble complex removal step, a centrifuge machine having a construction which is capable of feeding a latex continuously, performing a centrifugation operation continuously, and further being capable of discharging an insoluble complex removed from the latex continuously out of the centrifuge machine may be used, so that a shut-down operation of the centrifugation operation for removing an insoluble complex from the centrifuge machine may be omitted by capable of discharging the insoluble complex removed from the latex continuously out of the centrifuge machine, and therefore a continuous operation over a long period may be realized in an appropriate manner. In this regard, the construction which is capable of discharging an insoluble complex removed from the latex continuously out of the centrifuge machine according to the present invention is different from an embodiment in which a relatively large amount of the insoluble complex is discharged collectively, and means a construction which continuously discharges it at a constant rate. Specifically, considering the discharge rate per unit time (more particularly, the discharge rate per unit time, or the discharge rate per unit volume of the latex supplied to the centrifuge machine), it only requires a construction which enables an even discharge rate in a predetermined time period, but not an embodiment in which an insoluble complex is continuously discharged at a constant rate without interruption. For example, an embodiment, in which the discharge rate of an insoluble complex per unit volume of the latex supplied to the centrifuge machine, namely the amount of an insoluble complex discharged (unit: kg, in terms of the weight of a platinum group compound as a hydrogenation catalyst) per 1 m³ of the latex supplied to the centrifuge machine is preferably 0.05 kg/m³ or more, and more preferably 0.08 kg/m³ or more, is desirable.

The centrifuge machine used in the insoluble complex removal step may be any ones having the above construction, however from the viewpoint that removal and recovery of an insoluble complex may be carried out satisfactorily, a decanter-type centrifuge machine is preferred. FIG. 1 shows as an example of a centrifuge machine a decanter-type centrifuge machine having an outer rotating barrel, and a screw conveyor mounted in the outer rotating barrel rotatably relative thereto.

The decanter-type centrifuge machine shown in FIG. 1 is provided with an outer rotating barrel 1 rotatable in the direction of the arrow in FIG. 1, a screw conveyor 2 rotatable coaxially with the outer rotating barrel 1 and with a slight difference in a rotational speed, a feed tube 3 for feeding a latex, a solids discharge port 4, and a dam plate 5 for adjusting the liquid level. In the figure, reference numeral 6 is a driving motor, and reference numeral 7 is a gear box, and the outer rotating barrel 1 and the screw conveyor 2 are rotatable in the direction of the arrow in FIG. 1 at an optional speed by the action of the driving motor 6 and the gear box 7. The screw conveyor 2 is provided with a screw blade 8 formed in a spiral shape.

A centrifugal operation using the decanter-type centrifuge machine shown in FIG. 1 will be described. Firstly, a latex containing an insoluble complex is fed continuously via the feed tube 3 provided inside the screw conveyor 2 through the supply port 9 into the outer rotating barrel 1 rotating at high speed, and a high centrifugal force is applied to the latex by the rotation of the outer rotating barrel 1 so that an insoluble complex in the latex is separated by sedimentation on the inner wall of the outer rotating barrel 1. The insoluble complex separated by sedimentation is scraped by the screw blade 8 of the screw conveyor 2 rotating coaxially with the outer rotating barrel 1 with a slight difference in a rotational speed, and transported gradually toward the solids discharge port 4, and continuously discharged from the solids discharge port 4 to the outside of the decanter-type centrifuge machine. Meanwhile, the latex, from which the insoluble complex has been removed, overflows the dam plate 5 provided on the side opposite to the solids discharge port 4 for adjusting the liquid level, and is discharged. Then, a filtration operation, and the like is performed according to need on the latex from which the insoluble complex has been removed and discharged, so that a hydrogenated conjugated diene polymer latex from which the insoluble complex has been removed may be obtained.

In the decanter-type centrifuge machine shown in FIG. 1, the centrifugal force in the centrifugation operation is generated by the rotation of the outer rotating barrel 1, so that the centrifugal force can be adjusted according to the rotational speed of the outer rotating barrel 1. Therefore, when the decanter-type centrifuge machine shown in FIG. 1 is used, the centrifugal force in the centrifugation operation is adjusted within the above range by adjusting the rotational speed of the outer rotating barrel 1. In this regard, the following equation (1) holds between the rotational speed of the outer rotating barrel 1 and the centrifugal force.

$$RCF = R \times N^2 / 874 \quad (1)$$

(In the equation (1), RCF represents a centrifugal force (unit: G), R represents the radius of gyration of the outer rotating barrel 1 (unit: m), and N represents the number of revolutions per minute (unit: rpm).)

When the decanter-type centrifuge machine shown in FIG. 1 is used, the feed rate of a latex to the decanter-type centrifuge machine may be adjusted in the above range, for example, by regulating the liquid delivery pressure of the pump for sending the latex to the feed tube 3.

The difference between the rotational speed of the outer rotating barrel 1 and the rotational speed of the screw conveyor 2 may be appropriately set, but is preferably 15 revolutions per minute or less, and more preferably 12 revolutions per minute or less. By setting the difference between the rotational speed of the outer rotating barrel 1 and the rotational speed of the screw conveyor 2 within such a range, the removal and recovery efficiency with respect to an insoluble complex can be improved properly.

As described above, according to the production method of the present invention, a platinum group element contained in a hydrogenation catalyst used for a hydrogenation reaction can be removed and recovered at a high removal and recovery rate, and moreover the removal and recovery of the platinum group element can be carried out in an energy-saving way and in a short time. Therefore, the method is extremely useful from the viewpoint of the quality of the obtained hydrogenated conjugated diene polymer latex, and from the viewpoint of regeneration of the hydrogenation catalyst. In addition, according to the production method of the present invention, the recovery rate of a platinum group element contained in a hydrogenation catalyst can be attained preferably as high as 95.0% or more, and more preferably as high as 97.0% or more.

EXAMPLES

The present invention will be described more specifically below with reference to Examples and Comparative Example, provided that the present invention is not limited to the Examples. In the following, "part" is on a weight basis unless otherwise specified. The test or evaluation methods of physical properties and characteristics are as follows.

Example 1

Hydrogenation Step

Into an autoclave, 2 parts of potassium oleate, 180 parts of ion exchanged water, 34 parts of acrylonitrile, 4 parts of methacrylic acid, and 0.5 part of t-dodecyl mercaptan were sequentially charged. After replacing the inside of the reactor with nitrogen, 62 parts of 1,3-butadiene was injected therein. The reactor was cooled to 10° C., and 0.01 part of cumene hydroperoxide, and 0.01 part of ferrous sulfate were added. Next, the content of the reactor was stirred and mixed thoroughly for 16 hours while the reactor is kept at 10° C. Thereafter, the polymerization was terminated by adding a 10% aqueous solution of hydroquinone into the reactor. The polymerization conversion was 90%. Unreacted monomers were removed from the polymerization reaction solution to obtain an acrylonitrile/butadiene/methacrylic acid copolymer latex for being subjected to a hydrogenation reaction.

To palladium chloride (weight ratio of Pd metal in palladium chloride/acrylonitrile/butadiene/methacrylic acid copolymer in the latex is 2700 ppm by weight), an aqueous solution containing sodium chloride as much as 2 molar equivalents of the Pd metal in palladium chloride was added to obtain an aqueous solution of palladium. To 300 parts of the obtained aqueous solution of palladium, polyvinylpyrrolidone having a weight average molecular weight of 5,000 was added in an amount by weight 5 times as much as the Pd metal in palladium chloride, and further an aqueous solution of potassium hydroxide was added so as to prepare an aqueous catalyst solution with pH 12.0.

Subsequently, the total solid content concentration of the acrylonitrile/butadiene/methacrylic acid copolymer latex obtained above was adjusted to a 25% by weight, and 400 parts (100 parts in terms of solid content) of the acrylonitrile/butadiene/methacrylic acid copolymer latex whose total solid content concentration was adjusted, and 300 parts of an aqueous catalyst solution prepared above were charged into an autoclave equipped with a stirrer, and a nitrogen gas was fed for 10 min to remove the dissolved oxygen in the latex. After purging the inside of the system twice with a hydrogen gas, the pressure was raised to 3 MPa with hydrogen. The content was heated to 50° C., and allowed to react for 6 hours to yield a reaction mixture of a hydrogenated acrylonitrile/butadiene/methacrylic acid copolymer in a latex state.

Insoluble Complex Formation Step

Next, the pH of the reaction mixture of a hydrogenated acrylonitrile/butadiene/methacrylic acid copolymer in a latex state obtained above was adjusted to 6.1 by adding dilute sulfuric acid. A mixed aqueous solution was prepared by dissolving dimethylglyoxime (DMG) in an aqueous solution of potassium hydroxide having a concentration of 1.14% by mass. The prepared mixed aqueous solution was added to the reaction mixture of a hydrogenated acrylonitrile/butadiene/methacrylic acid copolymer where pH was adjusted, such that the amount of dimethylglyoxime came to correspond to a 2.5-fold molar amount of the Pd metal contained in palladium chloride used for the hydrogenation reaction (an amount equivalent to 1.25 times the stoichiometric composition ratio), and further an aqueous solution of hydrogen peroxide with a concentration of 10% by mass was added, such that the amount of hydrogen peroxide came to correspond to a 40-fold molar amount of the Pd metal. The pH of the reaction mixture after the addition of hydrogen peroxide water was 7.0. Subsequently, the mixture was heated to 80° C., and stirred for 2 hours, after which an insoluble complex precipitated in the latex.

Insoluble Complex Removal Step

Then, from the latex containing an insoluble complex prepared above, the insoluble complex was removed by a centrifugation operation using a decanter-type centrifuge machine (product name "PTM 300 screw type decanter", manufactured by TOMOE Engineering Co., Ltd.) shown in FIG. 1. Specifically, a latex containing the insoluble complex was continuously fed via the feed tube 3 through the supply port 9 into the decanter-type centrifuge machine shown in FIG. 1, and the insoluble complex was separated by continuous centrifugation by rotating the outer rotating barrel 1 and the screw conveyor 2. The latex, from which the insoluble complex was removed, overflowed the dam plate 5, and was discharged out of the decanter-type centrifuge machine. The centrifugation operation was carried out, discharging continuously the separated insoluble complex through the solids discharge port 4 out of the decanter-type centrifuge machine. The latex from which the insoluble complex was removed, and which was discharged out of the decanter-type centrifuge machine, was next filtrated with a 300 mesh filtration apparatus to produce continuously a hydrogenated conjugated diene polymer latex.

The centrifugation operation using a decanter-type centrifuge machine was performed under the following conditions.

Feed rate of latex to decanter-type centrifuge machine: 6.0 m³/hour

Centrifugal force: 1,000 G

Difference in rotational speed between outer rotating barrel 1 and screw conveyor 2: 4 rpm Then, the centrifugation operation using the above-described decanter-type centrifuge machine was continuously performed using 10 m³ of a latex containing an insoluble complex.

As the result of the centrifugation operation, the recovery rate of the palladium metal recovered as the insoluble complex (recovery rate of palladium metal (%)=amount of recovered palladium metal/amount of palladium metal in palladium chloride used for hydrogenation×100) was 97.8%.

Example 2

A hydrogenated conjugated diene polymer latex was produced in the same manner as in Example 1, except that the pH of the reaction mixture after the addition of hydrogen peroxide water was changed to 7.5 in the insoluble complex formation step. The recovery rate of the palladium metal recovered as an insoluble complex was 97.6%.

Example 3

A hydrogenated conjugated diene polymer latex was produced in the same manner as in Example 1, except that the pH of the reaction mixture after the addition of hydrogen peroxide water was changed to 6.5 in the insoluble complex formation step. The recovery rate of the palladium metal recovered as an insoluble complex was 97.5%.

Example 4

A hydrogenated conjugated diene polymer latex was produced in the same manner as in Example 1, except that the pH of the reaction mixture after the addition of hydrogen peroxide water was changed to 5.5 in the insoluble complex formation step. The recovery rate of the palladium metal recovered as an insoluble complex was 96.3%.

Comparative Example 1

A hydrogenated conjugated diene polymer latex was produced in the same manner as in Example 1, except that the pH of the reaction mixture after the addition of hydrogen peroxide water was changed to 8.4 in the insoluble complex formation step. The recovery rate of the palladium metal recovered as an insoluble complex was 94.8%.

TABLE 1

|  | Example 1 | Example 2 | Example 3 | Example 4 | Comparative Example 1 |
|---|---|---|---|---|---|
| Type of complexing agent | DMG | DMG | DMG | DMG | DMG |
| Amount of complexing agent used (folds) (with respect to stoichiometric composition ratio) | 1.25 | 1.25 | 1.25 | 1.25 | 1.25 |
| pH of latex in insoluble complex formation step | 7.0 | 7.5 | 6.5 | 5.5 | 8.4 |
| Temperature in insoluble complex formation step (° C.) | 80 | 80 | 80 | 80 | 80 |
| Stirring duration in insoluble complex formation step (hours) | 2 | 2 | 2 | 2 | 2 |
| Recovery rate of palladium metal (%) | 97.8 | 97.6 | 97.5 | 96.3 | 94.8 |

Table 1 summarizes the results of Examples 1 to 4, and Comparative Example 1.

As shown in Table 1, in Examples 1 to 4, in which the pH of the latex in the insoluble complex formation step was adjusted in the range of 5.0 to 8.0, although the contact time between palladium and dimethylglyoxime was as short as 2 hours, a palladium metal could be recovered at a high recovery rate.

On the other hand, in Comparative Example 1, in which the pH of the latex in the insoluble complex formation step was 8.4, the palladium metal recovery rate was low.

REFERENCE SIGNS LIST

1 Outer rotating barrel
2 Screw conveyor
3 Feed tube
4 Solids discharge port
5 Dam plate
6 Driving motor
7 Gear box
8 Screw blade
9 Supply port

The invention claimed is:

1. A method for producing a hydrogenated conjugated diene polymer latex, comprising:
   a hydrogenation step of dissolving or dispersing a hydrogenation catalyst containing a platinum group element in a latex of a conjugated diene polymer to hydrogenate a carbon-carbon unsaturated bond in the conjugated diene polymer; and
   an insoluble complex formation step of complexing the platinum group element in the latex with a complexing agent to form an insoluble complex so as to obtain a hydrogenated conjugated diene polymer latex containing the insoluble complex;
   wherein pH of the latex at the insoluble complex formation step is adjusted in a range of 5.0 to 8.0.

2. The method for producing a hydrogenated conjugated diene polymer latex according to claim 1, wherein an amount of the complexing agent used is an amount equivalent to 1.0 to 3.0 times a stoichiometric composition ratio capable of forming a complex with the platinum group element.

3. The method for producing a hydrogenated conjugated diene polymer latex according to claim 1, wherein the insoluble complex is formed by adding a solution or a dispersion containing the complexing agent to the latex.

4. The method for producing a hydrogenated conjugated diene polymer latex according to claim 1, wherein contact time between the platinum group element and the complexing agent is 2 to 5 hours.

5. The method for producing a hydrogenated conjugated diene polymer latex according to claim 1, further comprising an insoluble complex removal step of removing the insoluble complex from the latex having undergone the insoluble complex formation step.

6. The method for producing a hydrogenated conjugated diene polymer latex according to claim 1, wherein the pH of the latex at the insoluble complex formation step is adjusted in a range of 5.0 to 7.0.

\* \* \* \* \*